US012577404B1

(12) United States Patent
Alsayegh et al.

(10) Patent No.: US 12,577,404 B1
(45) **Date of Patent: \*Mar. 17, 2026**

(54) CARBON BLACK-BASED AQUEOUS SUSPENSIONS WITH IMPROVED STABILITY

(71) Applicant: KUWAIT UNIVERSITY, Safat (KW)

(72) Inventors: Naser Alsayegh, Safat (KW); Nawaf F. Aljuwayhel, Safat (KW); Husain Ashkanani, Safat (KW); Yousef Abdullah Altourah, Safat (KW)

(73) Assignee: KUWAIT UNIVERSITY, Safat (KW)

( * ) Notice: Subject to any disclaimer, the term of this patent is extended or adjusted under 35 U.S.C. 154(b) by 0 days.

This patent is subject to a terminal disclaimer.

(21) Appl. No.: 19/206,421

(22) Filed: May 13, 2025

(51) Int. Cl.
C09C 3/08 (2006.01)
C09C 1/60 (2006.01)
C09C 3/04 (2006.01)

(52) U.S. Cl.
CPC ................. *C09C 3/08* (2013.01); *C09C 1/60* (2013.01); *C09C 3/04* (2013.01)

(58) Field of Classification Search
CPC .... C09C 3/08; C09C 1/60; C09C 3/04; C09C 3/00
See application file for complete search history.

(56) References Cited

FOREIGN PATENT DOCUMENTS

| | | |
|---|---|---|
| CN | 114574001 A | 6/2023 |
| CN | 116239900 A | 6/2023 |
| JP | 2004198663 A * | 7/2004 |

OTHER PUBLICATIONS

Borode, A. O., et al., "Surfactant-aided dispersion of carbon nanomaterials in aqueous solution." Physics of Fluids 31.7 (2019). (Abstract).

Jeevananda, T., et al. "Synthesis and characterization of polyaniline-multiwalled carbon nanotube nanocomposites in the presence of sodium dodecyl sulfate." Polymers for Advanced Technologies 19.12 (2008): 1754-1762.

Rossi, J. E., et al. "Removal of sodium dodecyl sulfate surfactant from aqueous dispersions of single-wall carbon nanotubes." Journal of colloid and interface science 495 (2017): 140-148.

Xu, J., et al. "Strongly bound sodium dodecyl sulfate surrounding single-wall carbon nanotubes." Langmuir 33.20 (2017): 5006-5014. (Abstract).

Zueva, O. S., et al. "Structure and properties of aqueous dispersions of sodium dodecyl sulfate with carbon nanotubes." Russian Chemical Bulletin 65 (2016): 1208-1215. (Abstract).

(Continued)

*Primary Examiner* — Shuangyi Abu Ali
(74) *Attorney, Agent, or Firm* — Nath, Goldberg & Meyer; Joshua B. Goldberg

(57) ABSTRACT

A method for enhancing the dispersion stability of carbon black-based aqueous suspensions is provided. The method includes forming a thin sodium dodecyl sulfate (SDS) monolayer on the outer surface of the carbon black materials before the carbon black materials are dispersed in a base fluid. This is done by mixing SDS with dry carbon black powder at a ratio of about 1:0.5 by weight for about 15 minutes, under a controlled environment. After mixing the SDS with dry carbon black powder, the resulting mixture is added to distilled water and dispersed for 45 minutes using a sonicator. Once the dispersion process is completed, the suspension is stored for future use.

9 Claims, 7 Drawing Sheets

(56) References Cited

OTHER PUBLICATIONS

Ali, N., et al., "Aluminium Nanofluids Stability: A Comparison between the Conventional Two-Step Fabrication Approach and the Controlled Sonication Bath Temperature Method" J. of Nanomaterials, 3930572 (2019).

Ali, N. et al., "Carbon-Based Nanofluids and Their Advances towards Heat Transfer Applications—A Review," nanomaterials 2021 11(6): 1628.

Ali, N. et al., "A Review on Nanofluids: Fabrication, Stability, and Thermophysical Properties," J. of Nanomaterials, 6978130, (2018).

Yu, W., and Xie, H., "A Review on Nanofluids: Preparation, Stability Mechanisms, and Applications," J. of Nanomaterials, 435873, (2012).

Long, C. M., et al., "Carbon black vs. black carbon and other airborne materials containing elemental carbon: Physical and chemical distinctions," Environmental Pollution 181: 271-286 (2013).

Pena, J.M., et al., "The use of microwave and FTIR spectroscopy for the characterisation of carbon blacks modified with stabilisers," Polymer Degradation and Stability, 74(1): 1-24 (2001). (Abstract).

Demiral, I., et al., "Enrichment of the surface functional groups of activated carbon by modification method," Surfaces and Interfaces 22:100873 (2021). (Abstract).

Antony, N., et al., "Inhibition and Biocide Actions of Sodium Dodecyl Sulfate-Zn2+ System for the Corrosion of Carbon Steel in Chloride Solution," Portugaliae Electrochimica Acta, 28(1), 1-14 (2010).

* cited by examiner

CARBON BLACK-BASED AQUEOUS SUSPENSIONS WITH IMPROVED STABILITY

FIELD AND BACKGROUND OF THE INVENTION

The present disclosure relates to carbon black-based aqueous suspensions, and particularly to methods of improving the stability of carbon black-based aqueous suspensions.

DESCRIPTION OF THE PRIOR ART

Suspensions are advanced heat transfer fluids engineered by dispersing millimeter- to nanometer-sized particles in conventional base fluids like water, ethylene glycol, or oils. Suspensions containing dispersed micrometer-sized particles in a base fluid are commonly known as 'Microfluids'. Suspensions containing dispersed nanometer-sized particles in a base fluid are commonly known as 'Nanofluids'. These innovative liquids have significantly enhanced thermal properties when compared to their conventional counterparts, making them highly effective in various heat transfer applications, such as solar collectors, liquid cooled computers, air conditioning (AC) systems, and the like.

Traditionally, there are two main approaches to producing these suspensions. The first technique is known as the one-step (or single-step) method and the second technique is called the two-step method. In the single-step approach, particles are formed and dispersed within a base fluid in a single stage. The advantages of this approach include the production of a suspension having a higher dispersion physical stability; and avoiding the need to transport, store, and utilize a dry powder. The drawbacks of this method include difficulties in removing residual reactants resulting from incomplete reactions, and limitations regarding the specific particles and base fluids that are compatible with a single-step approach. The traditional two-step method uses pre-prepared powders (microparticles or nanoparticles), which are added and dispersed in a non-dissolving base fluid using a mixing device such as an ultrasonicator, a homogenizer, and magnetic stirring. The advantages of this approach are that any type of suspension can be manufactured, the method is relatively easy and can be performed by users with a minimum level of experience, the powders are commercially available on a wide scale, and the method can be adapted for both small- and large-scale production. However, suspensions made using the two-step method generally have lower dispersion physical stability when compared to suspensions made by the one-step method.

Thus, methods of improving the stability of carbon black-based aqueous suspensions solving the aforementioned problems are desired.

SUMMARY OF THE INVENTION

A method for enhancing the dispersion stability of carbon black-based aqueous suspensions is provided. The method includes forming a thin sodium dodecyl sulfate (SDS) monolayer on the outer surface of the carbon black materials before the carbon black materials are dispersed in a base fluid. This is done by mixing SDS with dry carbon black powder at a ratio of about 1:0.5 by weight for about 15 minutes, under a controlled environment. After mixing the SDS with dry carbon black powder, the resulting mixture is added to distilled water and dispersed for 45 minutes using a sonicator. Once the dispersion process is completed, the suspension is stored for future use.

In an embodiment, mixing the SDS with dry carbon black powder may comprise hand mixing. In a further embodiment, the hand mixing may comprise using a mortar and pestle.

In an embodiment, the temperature of the controlled environment can be set to about 20° C. to about 27° C. and the humidity of the controlled environment can be set to about 30% to about 50%.

These and other features of the present subject matter will become readily apparent upon further review of the following specification.

BRIEF DESCRIPTION OF DRAWINGS

Similar reference characters denote corresponding features consistently throughout the attached drawings.

DETAILED DESCRIPTION

Figure 1:
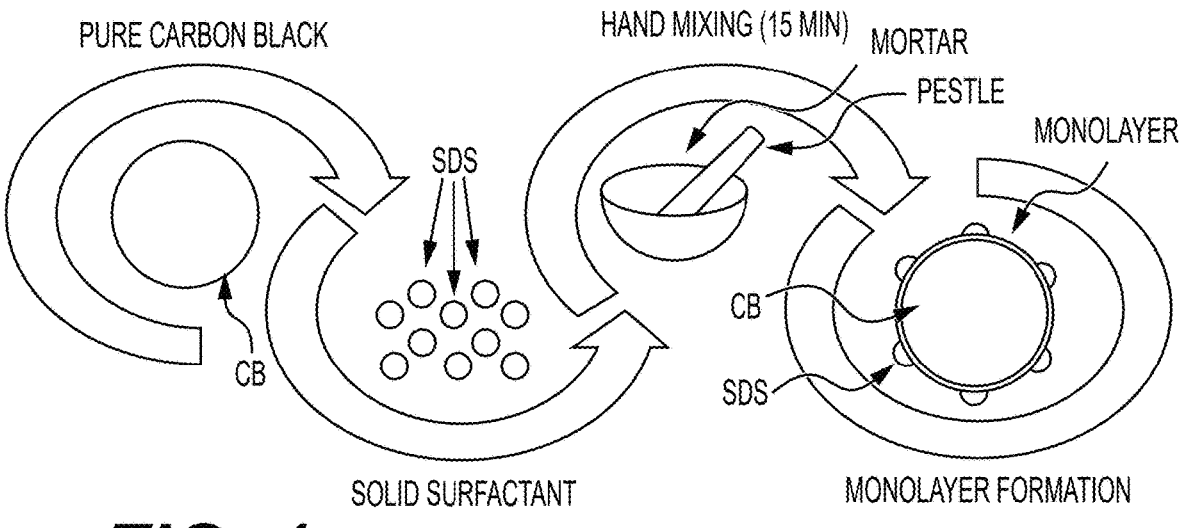
FIG. 1 is a diagram depicting the process used to form a SDS monolayer on carbon black particles.

The following definitions are provided for the purpose of understanding the present subject matter and for construing the appended patent claims.

Definitions

It should be understood that the drawings described above or below are for illustration purposes only. The drawings are not necessarily to scale, with emphasis generally being placed upon illustrating the principles of the present teachings. The drawings are not intended to limit the scope of the present teachings in any way.

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

It will be understood by those skilled in the art with respect to any chemical group containing one or more substituents that such groups are not intended to introduce any substitution or substitution patterns that are sterically impractical and/or physically non-feasible.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

A method for enhancing the dispersion stability of carbon black-based aqueous suspensions is provided. The method includes forming a thin sodium dodecyl sulfate (SDS) monolayer on the outer surface of the carbon black materials before the carbon black materials are dispersed in a base fluid. This is done by mixing SDS with dry carbon black powder at a ratio of about 1:0.5 by weight for about 15 minutes, under a controlled environment. After mixing the SDS with dry carbon black powder, the resulting mixture is added to distilled water and dispersed for 45 minutes using a sonicator. Once the dispersion process is completed, the suspension is stored for future use.

In an embodiment, mixing the SDS with dry carbon black powder may comprise hand mixing. In a further embodiment, the hand mixing may comprise using a mortar and pestle.

In an embodiment, the temperature of the controlled environment can be set to about 20° C. to about 27° C. and the humidity of the controlled environment can be set to about 30% to about 50%.

The key factors governing the success of any suspension include the selection of particles possessing particular desired properties and the dispersion stability of these particles within the base liquid. For heat transfer applications, the selection of particles is traditionally primarily based on their thermal conductivity. For this reason, researchers have focused on carbon-based materials, such as carbon nanotubes and graphene. For agriculture and soil stabilizing applications, scientists prefer the use of carbon black due to its eco-friendly nature and nutrition content. Additionally, the unique photothermal properties of carbon black-based suspensions make them an excellent choice for solar-thermal applications. The carbon black material itself is produced from incomplete combustion process or thermal decomposition of gaseous or liquid hydrocarbons.

In terms of dispersion stability, carbon black-based suspensions are unstable in their raw powder form. The particles tend to float on the surface of the base liquid. As such, scientists have used various methods in an effort to stabilize carbon black-based suspensions. One common method is using surface functionalization or oxidation. A second approach incorporates adding a surfactant to the base liquid to change its ionic charges. Scientists commonly test the physical stability of their fabricated suspensions using one or more of the following methods: the sedimentation photographical capturing method; dynamic light scattering (DLS); zeta potential analysis; the 3-@ approach; scanning electron microscopy (SEM) analysis; transmission electron microscopy (TEM) characterization; spectral analysis; the centrifugation method; or particle size analysis.

A method for enhancing the dispersion stability of carbon black-based aqueous suspensions is illustrated in FIG. 1. The method comprises forming a thin sodium dodecyl sulfate (SDS) monolayer on the outer surface of the carbon black materials before the carbon black materials are dispersed in a base fluid. This is done by mixing SDS with dry carbon black powder at a ratio of about 1:0.5 by weight for about 15 minutes, under a controlled environment. After mixing the SDS with dry carbon black powder, the resulting mixture is added to distilled water and dispersed for 45 minutes using a sonicator. Once the dispersion process is completed, the suspension is stored for future use.

Under the specific mixing conditions disclosed herein, the SDS molecules are adsorbed onto the surfaces of the carbon black particles. The hydrophobic tails of the SDS molecules interact with the hydrophobic carbon black particles surfaces, while the hydrophilic sulfate heads remain oriented outward. This arrangement forms a monolayer coating on the carbon black particles' outer surfaces. The specific temperature and humidity levels disclosed herein for use during the mixing process provide the necessary conditions to facilitate the adsorption process. Water molecules that are present in the surrounding air (i.e., humidity) act as a medium, and along with the specific temperature help to enhance the mobility of the SDS molecules and promote their interaction with the carbon black particles' surfaces.

In an embodiment, mixing the SDS with dry carbon black powder may comprise hand mixing. In a further embodiment, the hand mixing may comprise using a mortar and pestle.

In an embodiment, the temperature of the controlled environment can be set to about 20° C. to about 27° C. and the humidity of the controlled environment can be set to about 30% to about 50%.

In an embodiment, the SDS mixed with dry carbon black powder may be dispersed using a bath type sonicator. The water bath temperature of the sonicator is controlled throughout the process using a temperature regulator, and is maintained at about 25° C.

In an embodiment, the SDS mixed with dry carbon black powder may be dispersed using a probe sonicator to reduce the mixing duration and would provide the same results.

The carbon black-based aqueous suspensions with improved stability are particularly useful because they extend the performance of the suspension over time and thus provide suspensions that can be used for longer before being replaced, and whose performance does not degrade as quickly over time. Further, the methods of making carbon black-based aqueous suspensions with improved stability disclosed herein are simpler to perform and more cost effective when compared to surface functionalization of CB, or when compared to increasing SDS concentration in an SDS-water solution. The present methods are also more efficient in terms of maintaining the thermophysical properties of the dispersed CB particles.

The carbon black-based aqueous suspensions with improved stability may be useful for any application that makes use of suspensions. These uses include but are not limited to oil extraction through flooding with suspensions; heat exchangers, solar collectors, air conditioning (AC) systems, and nuclear power reactors (for energy output and for loss-of-coolant accident); soil stability and fertility enhancement applications in agriculture; and cooling applications such as cooling car radiators or computer processors.

The present subject matter may be better understood with reference to the following examples.

Example 1

Stability Analysis

A comparison between the present methods and other fabrication processes was conducted. In addition to testing the improved carbon black suspensions made by the methods disclosed above, this analysis included dispersing raw carbon black in water as a base liquid; as well as functionalizing the carbon black before dispersing the functionalized carbon black in water as a base liquid; dissolving an amount of SDS surfactant in water as a base fluid and then adding an amount of carbon black powder and dispersing it. Characterization of raw carbon black, functionalized carbon black, and carbon black mixed with SDS was performed. FIGS. 2-5 show X-ray diffraction (XRD), Fourier transform infrared (FTIR) spectroscopy, X-ray photoelectron (XPS) spectroscopy, and field emission scanning electron microscopy (FE-SEM) results characterizing the observed outcomes.

Figure 2:
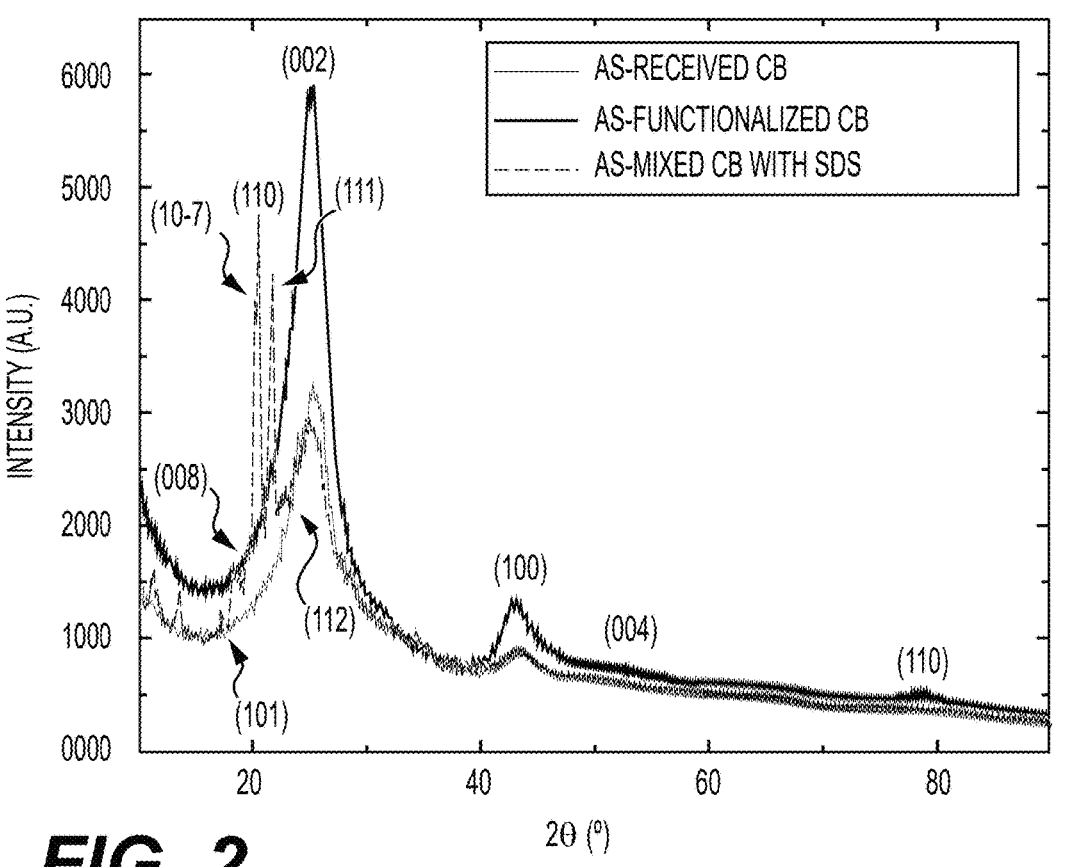
FIG. 2 is a graph illustrating an XRD analysis of carbon black (CB), functionalized CB, and CB mixed with SDS.

FIG. 2 shows an XRD analysis outcome of as-received carbon black (CB), as-functionalized CB, and as-mixed CB with SDS. The XRD pattern of CB and SDS corresponds to PDF card no. 00-058-1638 and PDF card no. 00-039-1996, respectively. The average crystallite size of the CB, Functionalized CB, and CB with SDS mixture is 1.67 nm, 2.01 nm, and 13.83 nm, respectively, based on the Debye Scherrer formula.

Figure 3:
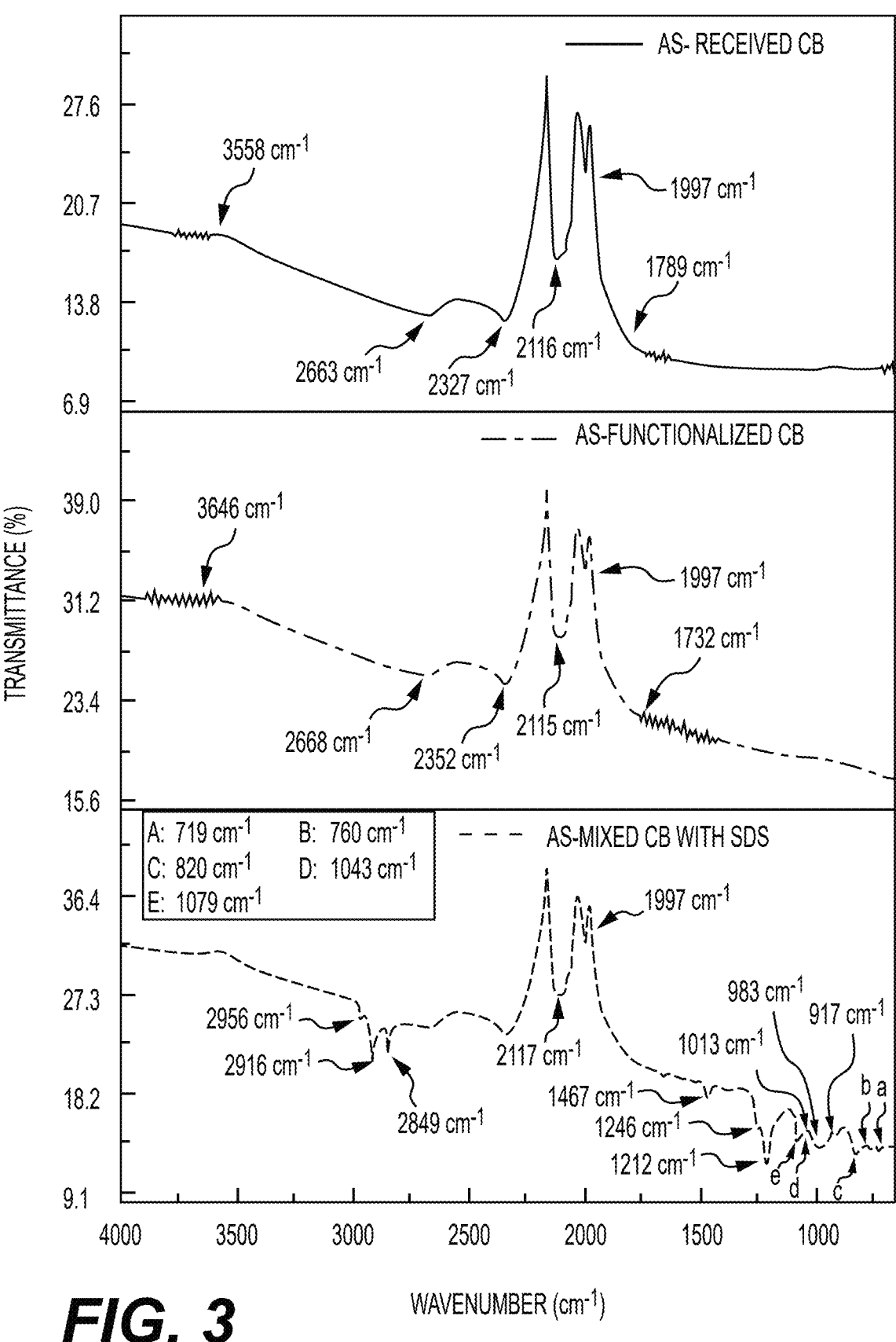
FIG. 3 depicts an FTIR analysis of CB, functionalized CB, and CB mixed with SDS.
Figure 4:
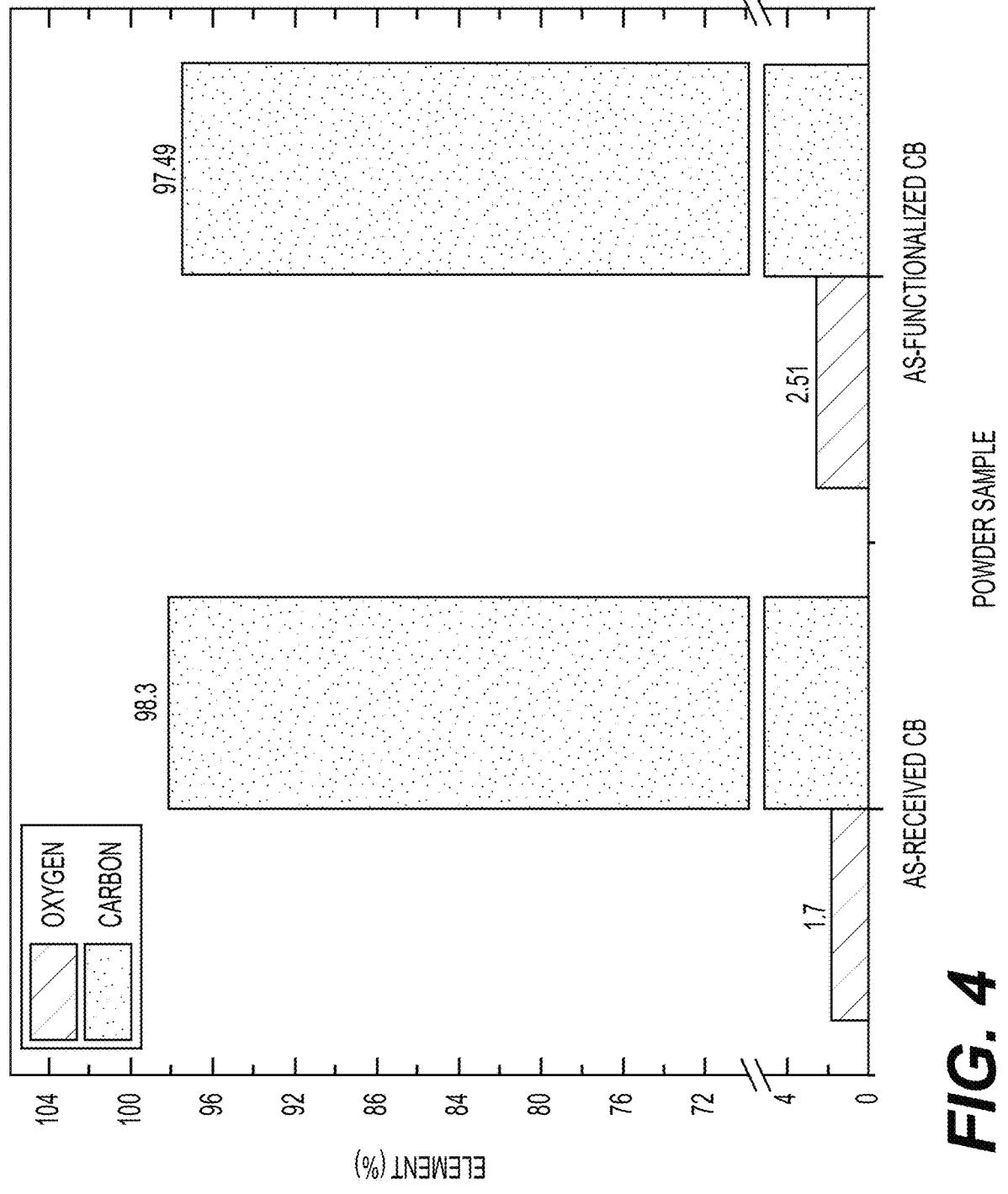
FIG. 4 depicts a graph of a XPS analysis of CB and functionalized CB.
Figures 5A, 5B, 5C, 5D, 5E, 5F:
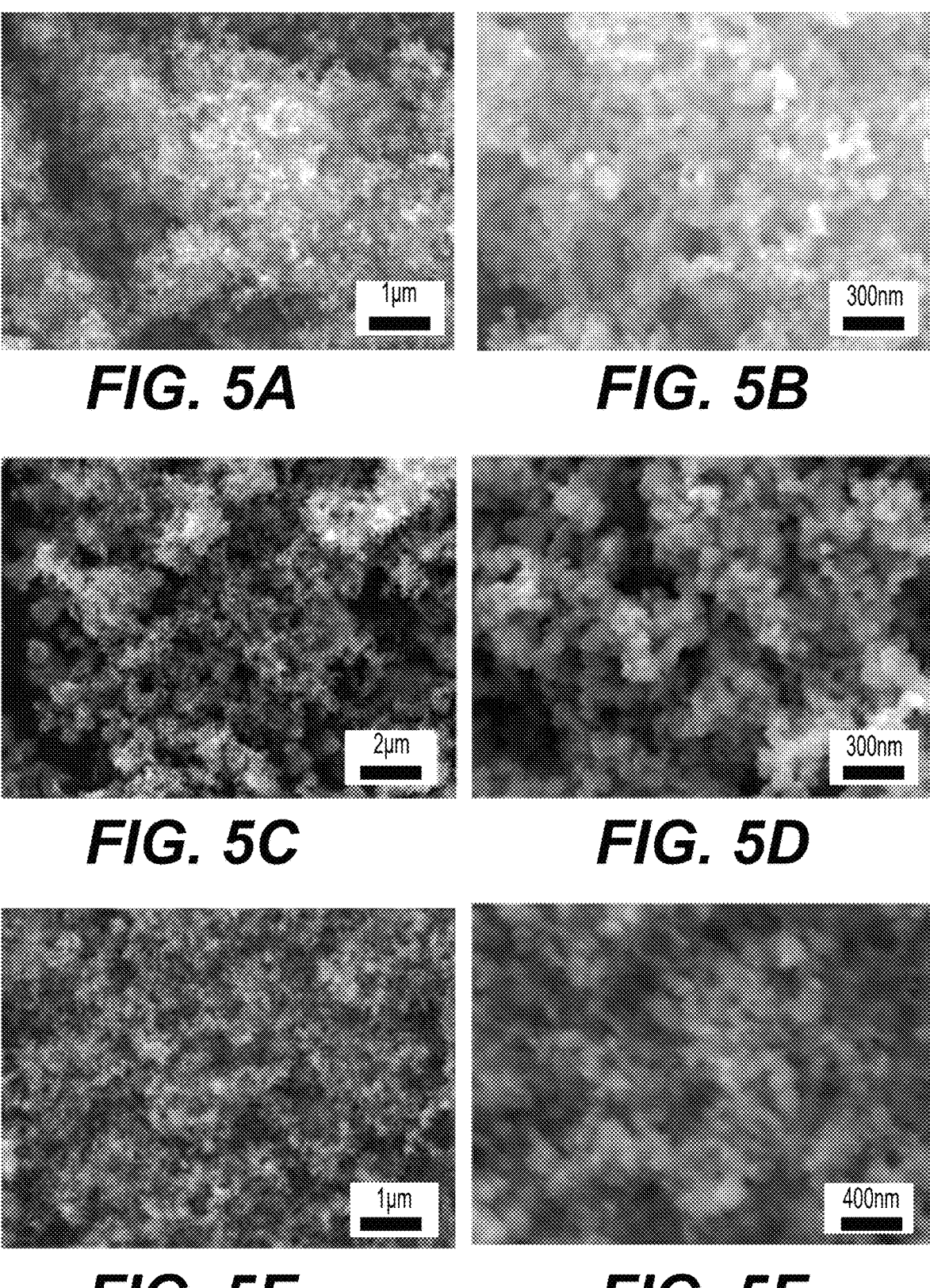
FIGS. 5A-5F depict FE-SEM images showing the morphology of the CB (FIGS. 5A-5B), functionalized CB (FIGS. 5C-5D), and CB mixed with SDS (FIGS. 5E-5F).

FIG. 3 shows an FTIR analysis outcome of the as-received CB, as-functionalized CB, and as-mixed CB with SDS powders. From the FTIR plots, it is deduced that the as received carbon black consists of carboxylic acid (COOH) functional groups, alkynes ($C \equiv C$), and aromatic hydrocarbons. In addition, the results showed carbon dioxide attached to the surface of the carbon black. In the case of the functionalized carbon black, similar results were shown to the as-received carbon black as the carboxylic acid functional group along with the alkynes and the aromatic hydrocarbons were evident. Also, the carbon dioxide attached to the surface of the carbon black can be seen. However, an additional alcohol (OH) functional group was observed for the functionalized carbon black. When mixed with SDS, the FTIR result of the carbon black shows several additional peaks compared to the former cases indicating that the monolayer formation was successful. As such, several alkane (C—H) groups were observed in addition to alky (C—O), alkene (C=C), and sulfoxide (S=O) functional groups. Note that previously observed functional groups in the pure carbon black particles remain in addition to the new functional groups observed.

For the raw carbon black suspension, the same amount of carbon material used in the presently disclosed methods was added directly to distilled water without any SDS surfactant then dispersed using the same mixing procedure.

The functionalized carbon black suspension was produced by initially fabricating the functionalized carbon black powder. This was done by adding 30% hydrogen peroxide ($H_2O_2$) to water in a beaker to form a solution, then adding the dry carbon black powder to the liquid to obtain a mixture. The employed weight ratio between the carbon black powder and $H_2O_2$ solution was 1:44.4. The mixture was then mixed using a magnetic stirrer for about 24 hours, at a temperature of about 80° C. Next, the mixture was vacuum filtered to remove any remaining liquid content, washed with distilled water, and dried under vacuum for about 1 hour under atmospheric conditions. The washing and vacuuming process was performed twice to remove all remaining $H_2O_2$ from the resulting particles. A filter sheet was then positioned on a glass substrate, the particles were placed on the filter sheet, and the filter sheet was placed in an oven at a temperature of about 60° C., for about 24 hours, to obtain the functionalized powder. Following the oven stage, the powder loosens and therefore is easily removed from the filter paper. The as-prepared functionalized carbon black powder is then added in the same quintet to distilled water, after which it is dispersed using the same previous sonication procedure.

The dissolved SDS surfactant was produced by adding the same amount of SDS used in the presently disclosed methods to distilled water to obtain a solution, magnetically stirring this solution for about 15 minutes to ensure a complete dissolution of the powder. Adding the same amount of carbon black powder to the solution and dispersing for 45 minutes using a bath type sonicator. The water bath temperature of the sonicator is controlled throughout the process using a temperature regulator, where it was maintained at 25° C.

Figure 6:
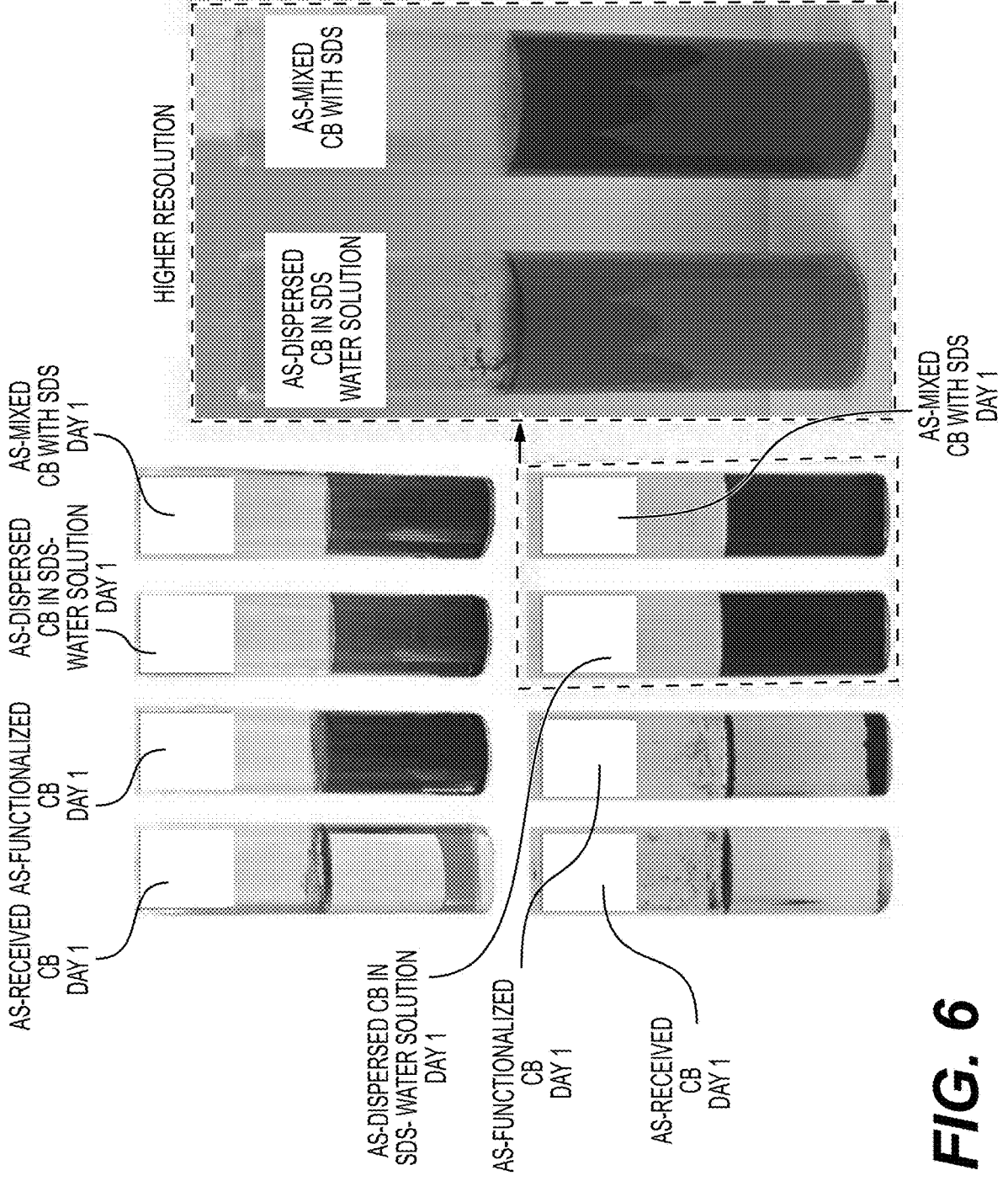
FIG. 6 depicts a stability analysis of suspension made of the CB, functionalized CB, CB mixed with SDS, and CB mixed with SDS and dispersed in water on Day 1 and on Day 7.
Figure 7:
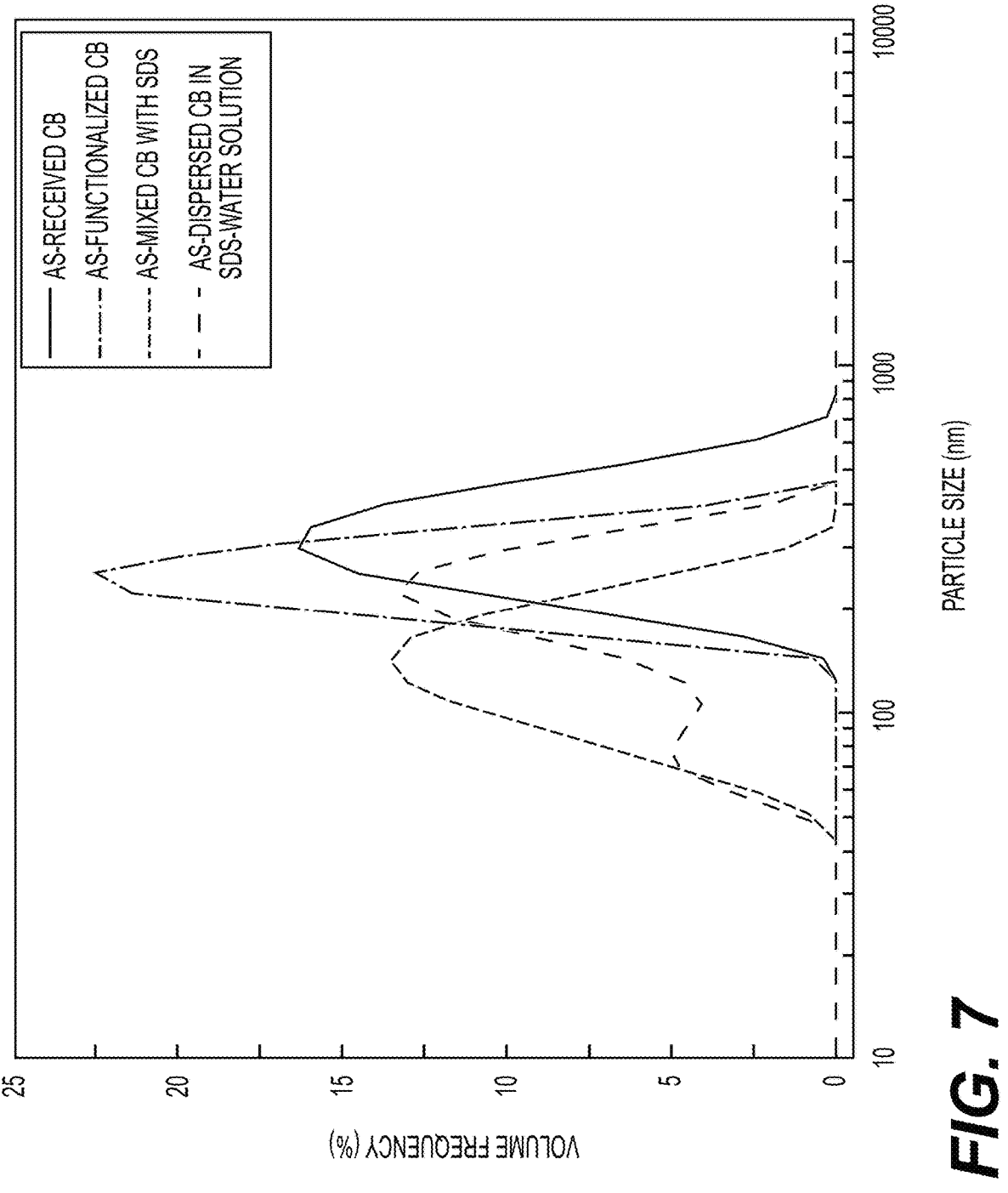
FIG. 7 depicts a graph showing particle size analyzer results for suspensions made of CB, functionalized CB, CB mixed with SDS, and CB mixed with SDS and dispersed in water.
Figure 8:
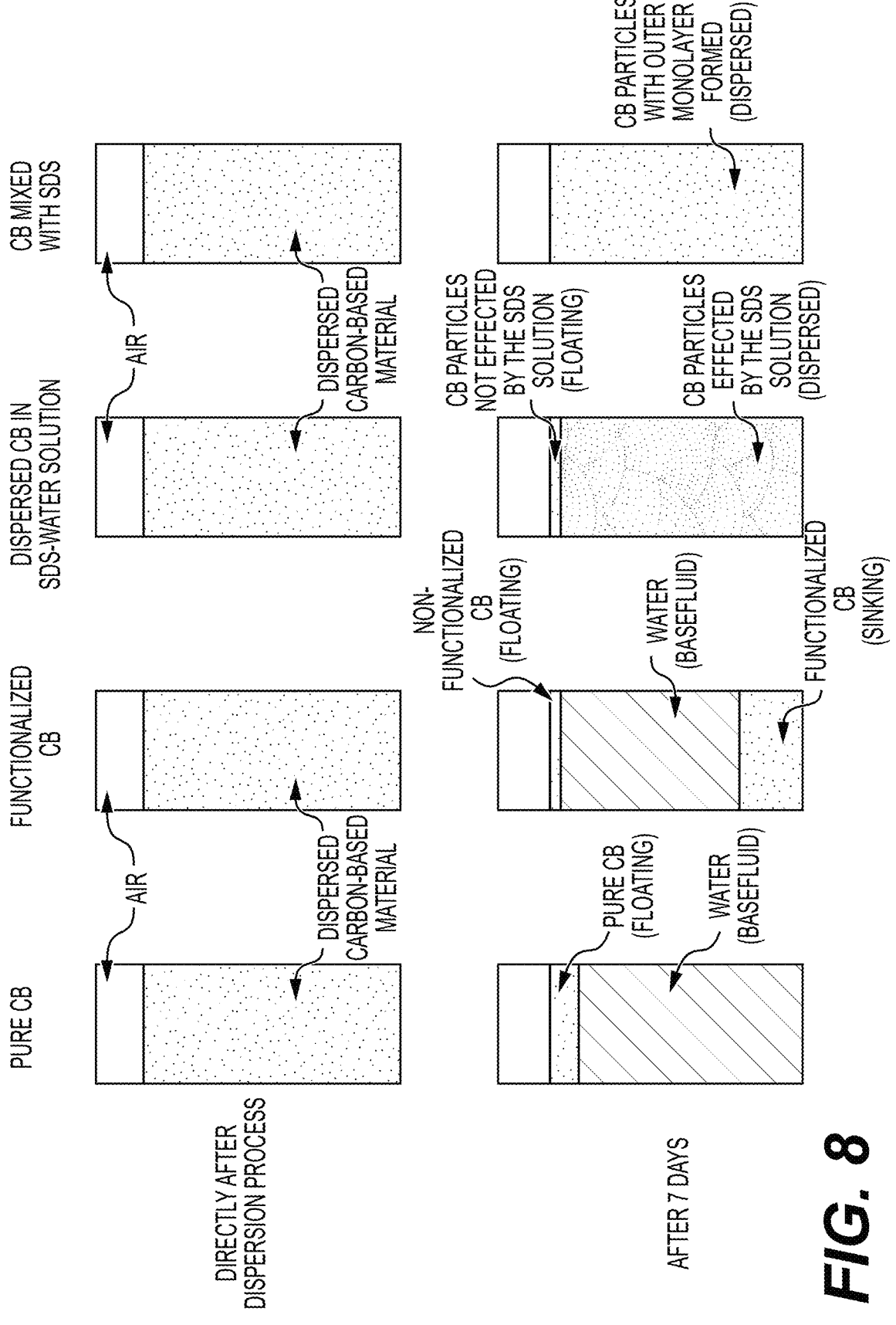
FIG. 8 depicts a summary of the changes in dispersion stability behavior observed for the suspensions made of CB, functionalized CB, CB mixed with SDS, and CB mixed with SDS and dispersed in water.

All suspensions were analyzed in terms of their dispersion stability using the image capturing approach and particle size analyzer, as shown in FIG. 6 and FIG. 7. FIG. 6 demonstrates that the suspension produced via the methods disclosed herein provided a higher level of dispersion stability compared to all other tested samples. This was also confirmed via the particle size analyzer outcomes shown in FIG. 7. These results illustrate the superiority of the new suspension stabilization approach for providing dispersions that have the highest physical stability compared to the other known methods. A summary of the changes in dispersion stability behavior that was experienced with the different formed suspensions is shown in FIG. 8.

It is to be understood that the carbon black-based aqueous suspensions with improved stability are not limited to the specific embodiments described above, but encompass any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method of making a carbon-black based suspension, the method comprising:

mixing sodium dodecyl sulfate (SDS) with dry carbon black powder at a ratio of about 1:0.5 by weight for about 15 minutes, under a controlled environment, to obtain a mixture; and adding the mixture to distilled water and dispersing the mixture within the water using a sonicator to obtain the carbon-black based suspension;

wherein the temperature of the controlled environment is between about 20° C. and about 27° C. and the humidity of the controlled environment is between about 30% and about 50%.

2. The method of claim 1, wherein mixing sodium dodecyl sulfate (SDS) with dry carbon black powder comprises hand mixing.

3. The method of claim 2, wherein the hand mixing comprises mixing with a mortar and pestle.

4. The method of claim 1, wherein the sonicator is a water bath sonicator.

5. The method of claim 4, wherein the water bath temperature of the water bath sonicator is maintained at about 25° C.

6. A method of making a carbon-black based suspension, the method consisting of:

hand mixing sodium dodecyl sulfate (SDS) with dry carbon black powder at a ratio of about 1:0.5 by weight for about 15 minutes, under a controlled environment, to obtain a mixture; and adding the mixture to distilled water and dispersing the mixture within the water using a sonicator to obtain the carbon-black based suspension;

wherein the temperature of the controlled environment is between about 20° C. and about 27° C. and the humidity of the controlled environment is between about 30% and about 50%.

7. The method of claim 6, wherein the hand mixing is mixing with a mortar and pestle.

8. The method of claim 6, wherein the sonicator is a water bath sonicator.

9. The method of claim 8, wherein the water bath temperature of the water bath sonicator is maintained at about 25° C.

* * * * *